US012562478B2

(12) United States Patent
Kenkel et al.

(10) Patent No.: US 12,562,478 B2
(45) Date of Patent: Feb. 24, 2026

(54) BAND SELECTABLE GEOMETRY FOR PRINTED CIRCUIT BOARD ANTENNAS

(71) Applicant: Shure Acquisition Holdings, Inc., Niles, IL (US)

(72) Inventors: Mark A. Kenkel, Schaumburg, IL (US); Steven M. Grad, Northbrook, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 291 days.

(21) Appl. No.: 17/988,427

(22) Filed: Nov. 16, 2022

(65) Prior Publication Data

US 2024/0162610 A1 May 16, 2024

(51) Int. Cl.

*H01Q 5/335* (2015.01)
*H01Q 5/321* (2015.01)
*H01Q 9/26* (2006.01)
*H01Q 15/00* (2006.01)

(52) U.S. Cl.

CPC ............ *H01Q 5/335* (2015.01); *H01Q 5/321* (2015.01); *H01Q 9/26* (2013.01); *H01Q 15/002* (2013.01)

(58) Field of Classification Search

CPC .......... H01Q 5/335; H01Q 5/321; H01Q 9/26; H01Q 15/002

See application file for complete search history.

(56) References Cited

U.S. PATENT DOCUMENTS

| | | | |
|---|---|---|---|
| 6,067,052 | A | 5/2000 | Rawles et al. |
| 6,353,443 | B1 | 3/2002 | Ying |
| 6,452,556 | B1 | 9/2002 | Ha et al. |

(Continued)

FOREIGN PATENT DOCUMENTS

| | | | |
|---|---|---|---|
| CN | 110996497 | A | 4/2020 |
| EP | 2034555 | B1 | 1/2011 |
| KR | 100278571 | B1 | 1/2001 |

OTHER PUBLICATIONS

Feb. 21, 2024—(WO) International Search Report and Written Opinion—App PCT/US2023/079315.

(Continued)

*Primary Examiner* — Amal Patel
(74) *Attorney, Agent, or Firm* — Banner & Witcoff, Ltd.

(57) ABSTRACT

A printed circuit board (PCB) assembly supports selecting alternate printed antenna geometries of an antenna by selectively placing common PCB components (for example, zero-ohm resistors) on the PCB. The desired zero-ohm resistors may be placed using automated part placement equipment commonly used to place surface mount components. The configurable antenna comprises at least one antenna section having a plurality of antenna components. Zero-ohm resistors are selectively placed in series along the antenna section to couple the desired conductor components when manufacturing the PCB assembly. With some embodiments, a configurable antenna includes a low frequency antenna section that may be selectively coupled with a high frequency antenna section antenna through one or more zero-ohm resistors, where each antenna section has a plurality of antenna components. With this approach, a common printed circuit board may be used to support a plurality of antenna variations spanning different frequency bands.

31 Claims, 11 Drawing Sheets

(56) References Cited

U.S. PATENT DOCUMENTS

| | | | |
|---|---|---|---|
| 6,850,197 B2 | 2/2005 | Paun | |
| 6,963,309 B2 | 11/2005 | Andersson et al. | |
| 7,034,750 B2 | 4/2006 | Asakura et al. | |
| 7,053,837 B2 | 5/2006 | Il et al. | |
| 7,292,198 B2 | 11/2007 | Shtrom et al. | |
| 7,417,588 B2 | 8/2008 | Castany et al. | |
| 7,724,193 B2 | 5/2010 | Soora et al. | |
| 7,924,226 B2 | 4/2011 | Soler Castany et al. | |
| 7,940,218 B2 | 5/2011 | Jansen | |
| 8,044,877 B2 | 10/2011 | Wang et al. | |
| 8,188,926 B2 | 5/2012 | Ganwani et al. | |
| 8,525,730 B2 | 9/2013 | Christian et al. | |
| 8,674,891 B2 | 3/2014 | Lopez et al. | |
| 9,236,657 B2 | 1/2016 | Nagumo et al. | |
| 9,391,362 B1 | 7/2016 | Kim et al. | |
| 9,667,215 B2 | 5/2017 | Uejima | |
| 9,680,210 B2 | 6/2017 | Ella | |
| 10,727,568 B2 | 7/2020 | Cho et al. | |
| 2010/0109955 A1 | 5/2010 | Anguera et al. | |
| 2010/0123635 A1* | 5/2010 | Lopez | H01Q 5/364 343/753 |
| 2011/0309985 A1 | 12/2011 | He et al. | |
| 2014/0361941 A1 | 12/2014 | Jenwatanavet et al. | |
| 2015/0223323 A1 | 8/2015 | O'Flynn | |
| 2016/0072188 A1* | 3/2016 | Alkhateeb | H01Q 9/145 343/823 |
| 2017/0141469 A1 | 5/2017 | Huang | |
| 2017/0280565 A1 | 9/2017 | Tso | |
| 2018/0294580 A1* | 10/2018 | Horibe | H01Q 5/321 |
| 2019/0280384 A1 | 9/2019 | Voor et al. | |
| 2020/0119436 A1* | 4/2020 | Hung | H01Q 9/42 |
| 2022/0224015 A1 | 7/2022 | Taki et al. | |

OTHER PUBLICATIONS

"What Are Zero-Ohm Resistors and How Are They Used In Circuit Design? Mar. 6, 2020 by Robert Keim", <https://www.allaboutcircuits.com/technical-articles/what-are-zero-ohm-resistors-how-are-they-used-in-circuit-design/>.

Benefits For Zero Ohm Resistor in Circuit Design, <https://resources.pcb.cadence.com/blog/2020-benefits-for-zero-phm-resistor-in-circuit-design>.

RF Antenna Matching Circuit Design For 53.4-219.2J Load, <https://electronics.stackexchange.com/questions/614051/rf-antenna-matching-circuit-design-for-53-4-219-2j-load>.

"Rectifiers' Design and Optimization for a Dual Channel RF Energy Harvester Davide Colaiuda", <https://www.semanticscholar.org/paper/Rectifiers%E2%80%99-Design-and-Optimization-for-a-RF-Energy-Colaiuda-Ulisse/724e516a5470d39643e1ab1c57daa121e6de1b81>.

* cited by examiner

700

900

BAND SELECTABLE GEOMETRY FOR PRINTED CIRCUIT BOARD ANTENNAS

BACKGROUND

Low-cost wireless devices have used antennas printed on an RF printed circuit board (PCB) substrate to reduce antenna costs. This traditional approach typically limits the printed circuit board only to one frequency band and requires different PCBs be created to operate at additional frequency bands. Other common antenna approaches utilize multiple conductors each tuned to different bands.

SUMMARY

This summary is provided to introduce a selection of concepts in a simplified form that are further described below in the Detailed Description. This Summary is not intended to identify key features or essential features of the disclosure.

According to some aspects of the present disclosure, an antenna is configurable on a printed circuit board (PCB) assembly by selectively placing common PCB components (for example, zero-ohm resistors). Desired zero-ohm resistors may be installed using automated part placement equipment commonly used to place surface mount components. The configurable antenna comprises at least one antenna section having a plurality of antenna components. Zero-ohm resistors are selectively placed in series along the antenna section to couple the desired antenna components when manufacturing the PCB assembly. With some embodiments, a configurable antenna includes a low frequency antenna section that may be selectively coupled with a high frequency antenna section antenna through one or more zero-ohm resistors, where each antenna section has a plurality of antenna components.

According to further aspects of the disclosure, this may lower product costs by reducing the number of raw PCB SKUs required to support multiple frequency band variations of the product.

According to further aspects of the disclosure, common PCB components may comprise passive linear lumped electrical elements such as resistors, inductors, and/or capacitors having desired impedance characteristics. The common components may be installed on the PCB in different manners such as surface mounting or inserting into the PCB.

According to further aspects of the disclosure, an antenna component may comprise a metallic trace deposited on a PCB having a selected trace pattern such as serpentine, zig-zag, or straight line. Moreover, different antenna components may have different trace patterns and may be coupled through one or more circuit board vias.

According to further aspects of the disclosure, different types of antennas may be supported including a dipole, loop, planar inverted-F antenna (PIFA), and other types of patch antennas.

According to further aspects of the disclosure, a ground for an antenna structure may be provided by a ground plane supported by one or more layers of a PCB and/or chassis enclosing a PCB antenna structure.

These and other aspects will be described in Detailed Description below with reference to the various drawings.

BRIEF DESCRIPTION OF THE DRAWINGS

A more complete understanding of the exemplary embodiments of the present invention and the advantages thereof may be acquired by referring to the following description in consideration of the accompanying drawings, in which like reference numbers indicate like features and wherein.

DETAILED DESCRIPTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

According to aspects of the disclosure, an antenna is configurable on a printed circuit board (PCB) assembly by selectively placing common PCB components (for example, zero-ohm resistors), where the antenna is configurable for one of a plurality of frequency bands. Desired zero-ohm resistors may be placed using automated part placement equipment commonly used to place surface mount components. The configurable antenna comprises at least one antenna section having a plurality of antenna components. Zero-ohm resistors are selectively placed in series along the antenna section to couple the desired antenna components when manufacturing the PCB assembly. The configurable antenna may include a low frequency antenna section that may be selectively coupled with a high frequency antenna section antenna through one or more zero-ohm resistors, where each antenna section has a plurality of antenna components. The approach may lower product costs by reducing the number of raw PCB SKUs required to support multiple frequency bands variations of the product.

Figure 1:
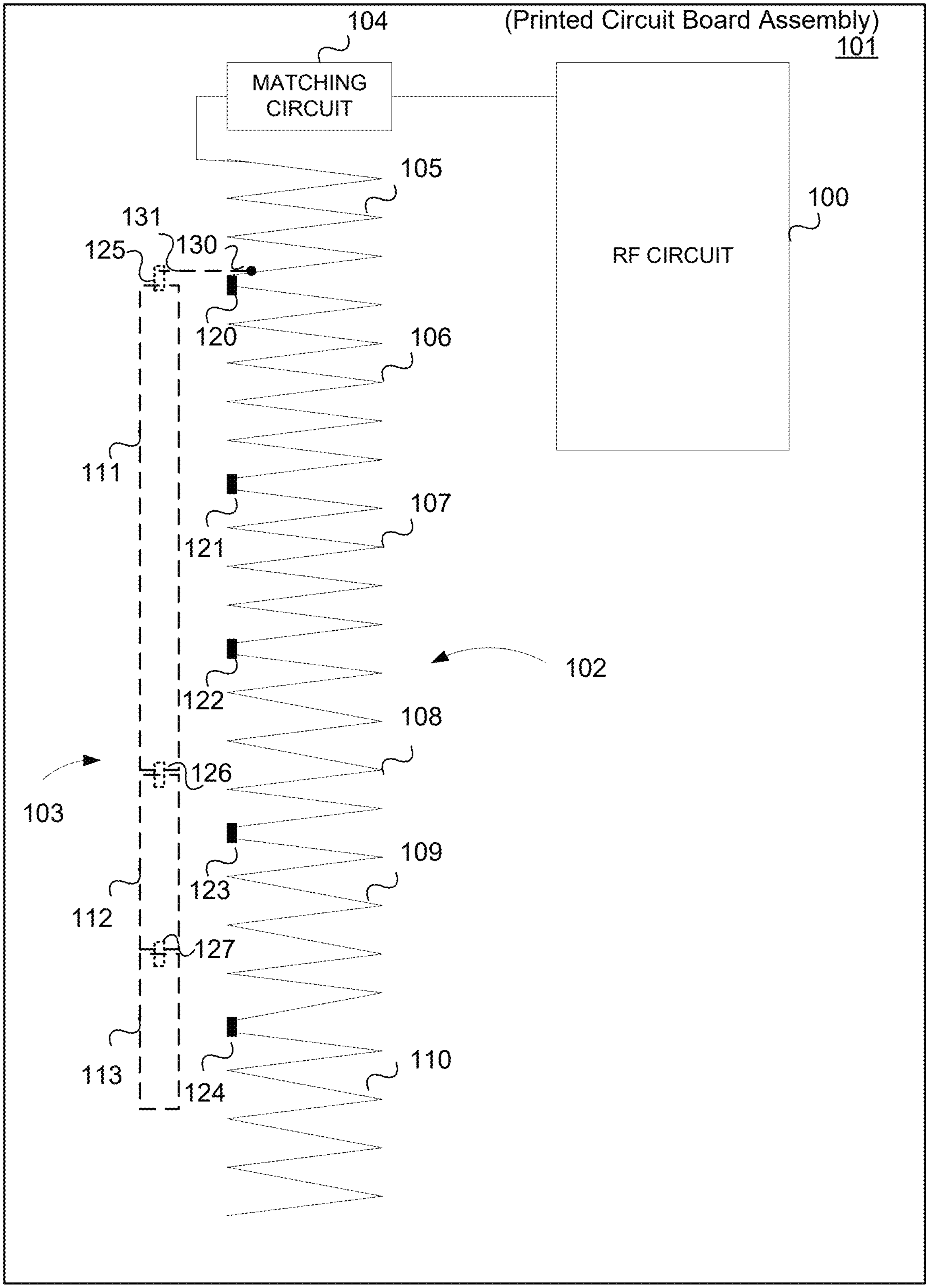
FIG. 1 shows a top view of a printed circuit board assembly in accordance with one or more aspects described herein.

FIG. 1 shows a top view of printed circuit board assembly 101 in accordance with one or more aspects described herein.

According to traditional approaches, wireless devices often utilize antennas printed (etched) on the printed circuit board (PCB) substrate. This approach typically limits the PCB to one frequency band and requires that different PCB's be created to operate in additional frequency bands. For example, in order to support eight different frequency bands, traditional approaches would require eight different raw PCB SKU's, where each PCB SKU is used for a given frequency band. (A SKU is a stock keeping unit to identify and track inventory and is typically represented by a unique code.) This approach typically requires stocking and selecting the correct antenna for the band being produced. Since the different length antennas may be difficult to distinguish, the different PCB SKU's may also be color coded to make the proper selection easier.

Alternative approaches may use a common PCB with a controlling circuit to activate/deactivate different switches to configure an apparatus for a particular frequency band while the apparatus is in an operational mode.

As will discussed in greater detail, the embodiment shown in FIG. 1 can support nine different frequency bands with one raw PCB SKU. Each raw PCB SKU may support one or more frequency bands and may support any number of frequency bands in accordance with available space on the PCB. This approach simplifies stocking logistics, thus reducing production costs while reducing possible errors for the frequency band configuration.

In accordance with an aspect, PCB assembly 101 allows the selection of alternate printed antenna geometries by placing/removing common PCB components such as zero-ohm resistors. The desired resistors may be placed using automated part placement equipment commonly used to place surface mount components. The zero-ohm resistors may be placed in series along the antenna conductor to join the desired conductor components. In this way, one common printed circuit board (in other words, a single SKU) may be used to produce several antenna variations. This approach typically lowers product costs by reducing the number of raw PCB SKUs required to generate multiple frequency bands variations of the product.

PCB assembly comprises RF circuitry 100 (for example, microphone transmitter, handheld transceiver, and so forth) interfaces with an antenna (comprising antenna sections 102 and 103) through matching circuit 104.

As shown in the table below and referring to FIG. 1, the antenna may be configured for one of frequency bands F1-F8 by installing (placing) zero-ohm resistors when manufacturing PCB assembly 110 with the common SKU printed circuit board. With the embodiment depicted in the table, component 105 is used both for low and high frequencies. However, with some embodiments, component 105 may have a different pattern such as a straight line or may not be used.

| Frequency Band | Placement of Zero-Ohm Resistors |
|---|---|
| F0 | None |
| F1 | 120 |
| F2 | 120, 121 |
| F3 | 120, 121, 122 |
| F4 | 120, 121, 122, 123 |
| F5 | 120, 121, 122, 123, 124 |
| F6 | 125 |
| F7 | 125, 126 |
| F8 | 125, 126, 127 |

As depicted in FIG. 1, antenna (radiating) section 102 comprises antenna components 105-110 (shown as having a serpentine pattern), where adjacent antenna components may be selectively coupled by placing or not placing zero-ohm resistors between the adjacent antenna components at the time of manufacturing. Antenna (radiating) section 103 comprises antenna components 111-113 (shown having straight line segments). Antenna components 105-113 may be formed by traces on the PCB, where components 105-110 or components 111-113 do not have the same type of pattern. Moreover, the shapes of antenna components are not limited to straight line or serpentine patterns and thus may be some other type of pattern such as a curved shape.

As shown in FIG. 1, antenna section 102 is located on the top PCB layer while antenna section 103 is located on the opposite (bottom) PCB layer. Antenna section 103 may be selectively coupled to antenna component 105 through VIA 130 and trace 131 by placing a zero-ohm resistor at location 125 without placing a zero-ohm resistor at location 120. However, with some embodiments, VIA 130 may be located at a different location (for example, before antenna component 105) so that antenna section 103 may be selectively coupled to antenna section 102 at one of a plurality locations along antenna section 102.

With an aspect of the embodiments, a PCB antenna assembly supports an antenna with alternate conductive geometries that can be configured at the time of PCB component placement on the PCB. Placement of surface-mount components on the PCB is typically an automated process. The correct antenna geometry is selected by programed component placement for each available frequency band. This process consequently minimizes human error and the chances of an incorrect antenna being placed during the assembly process. Since zero-ohm surface-mount components are low cost (perhaps fractions of a cent) the cost to implement an embodiment is minimal. In comparison, the cost of producing multiple PCB SKUs may be several dollars. The alternative cost of forming and color coding alternate helical antennas may be approximately fifty cents.

Embodiments of the disclosure may utilize a multi-layer PCB such as two layers as described above. Moreover, some embodiments may utilize a PCB with three or more layers, where one or more of the layers may provide a ground plane and where a plurality of antenna sections are located at different PCB layers.

While FIG. 1 shows an embodiment with zero-ohm resistors, embodiments of the disclosure may utilize other types of passive linear lumped electrical elements such as capacitors and/or inductors, where the impedance of the electrical elements may affect the performance of the antenna. Also, the passive linear lumped electrical elements may be installed in different ways such as surface mounting or inserting into the PCB.

While embodiments may utilize traces on a PCB to form antenna sections, some embodiments may support one or more antenna sections that are external to the PCB, where connections to the one or more external antenna sections are established through passive linear lumped electrical elements when manufacturing the PCB assembly.

Figure 2:
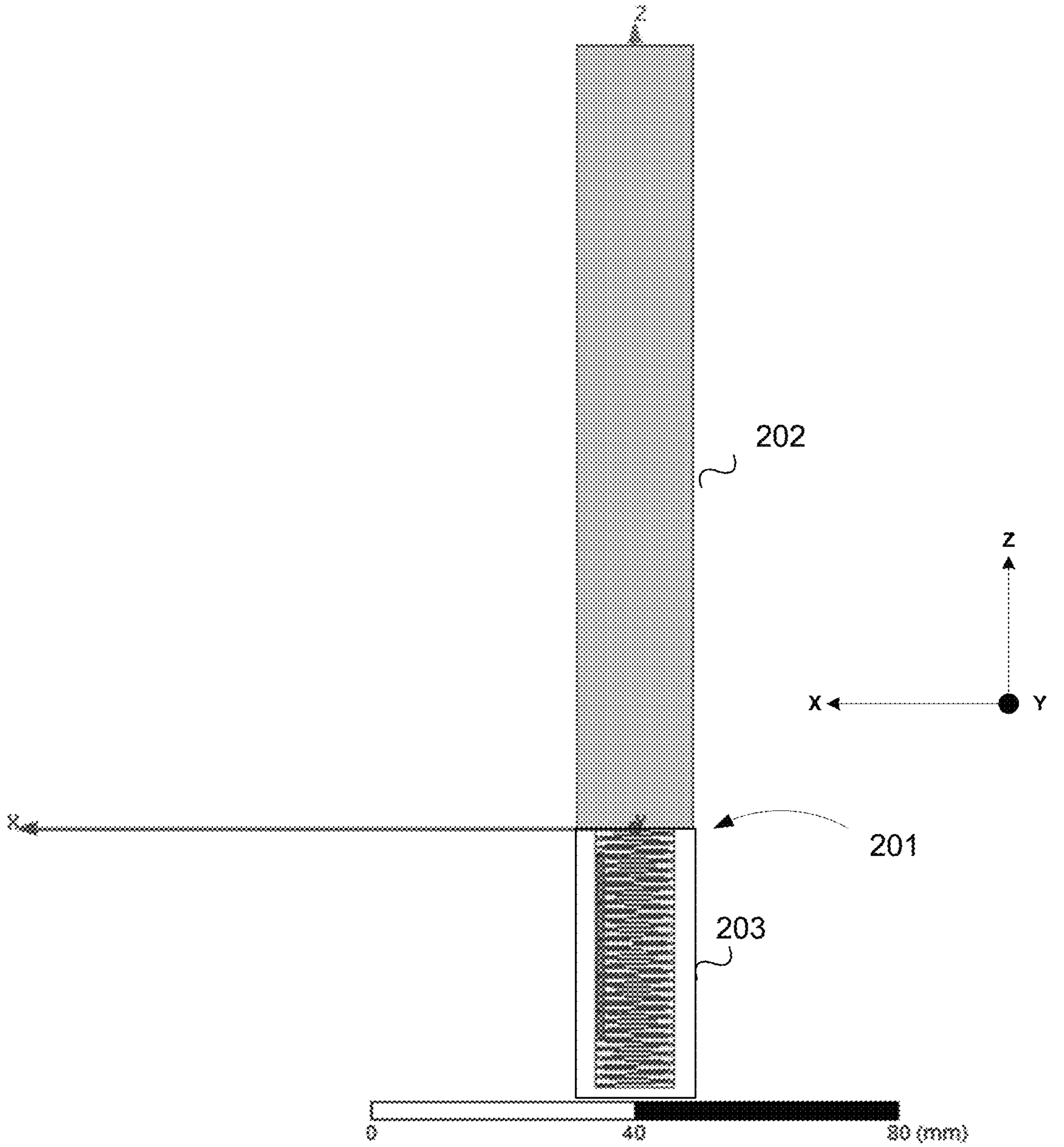
FIG. 2 shows an example of an RF printed circuit board assembly in accordance with one or more aspects described herein.

FIG. 2 shows an example of an RF printed circuit board assembly 201 comprising PCB portions 202 and 203. Portion 202 supports a PCB ground while portion 203 supports an antenna printed on the PCB.

RF printed circuit board assembly 201 may support a wireless microphone with a cost-effective transmitter and an internal monopole antenna. To fit the antenna into a small chassis, the antenna utilizes a copper trace printed in a zigzag or serpentine pattern on PCB portion 203 at the base of the microphone PCB. The length of the trace of the internal antenna determines the antennas frequency of operation, where the lowest frequency band corresponds to the longest conductive path. As will be discussed in greater detail, by not installing one or more zero-ohm resistors placed along the antenna trace at time of manufacture, the antenna can be made electrical shorter to support operation at higher frequency bands.

Embodiments of the disclosure may provide antenna geometries at VHF and Wi-Fi frequencies supporting transmitters, receivers, and transceivers for handheld, body pack, and rack-mounted applications.

Figure 3:
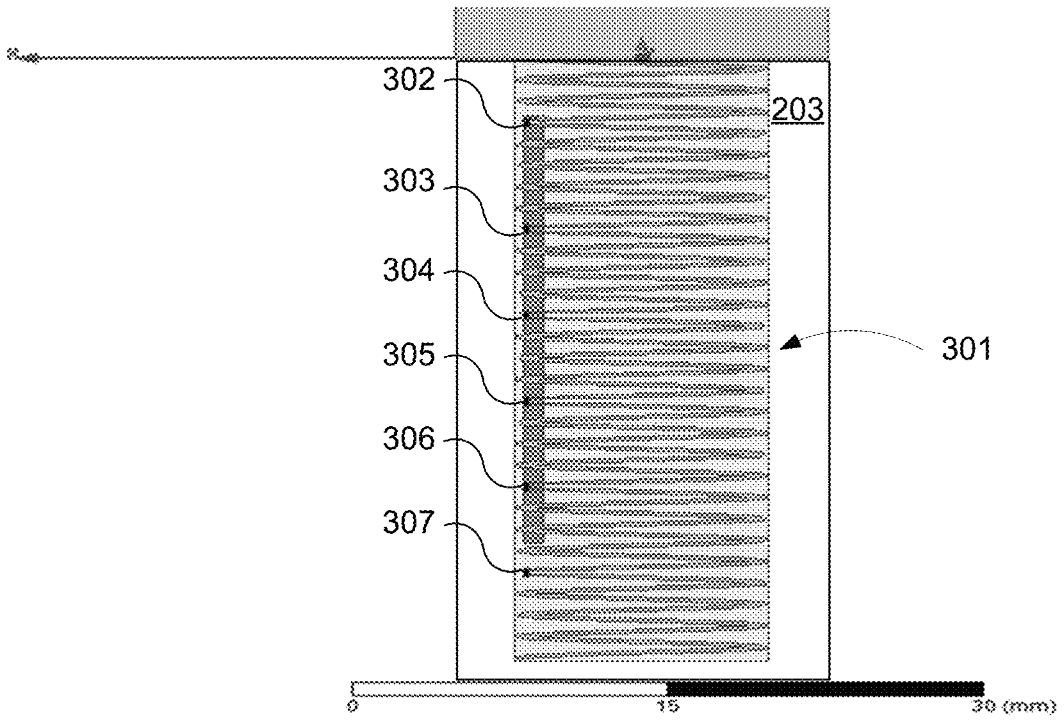
FIG. 3 shows an example of zero-ohm resistors connecting serpentine antenna components on the printed circuit board shown in FIG. 2 in accordance with one or more aspects described herein.

FIG. 3 shows an example of zero-ohm resistors 302-307 connecting serpentine antenna components of antenna section 301 on PCB portion 203 shown in FIG. 2 in accordance with one or more aspects described herein.

Figure 4:
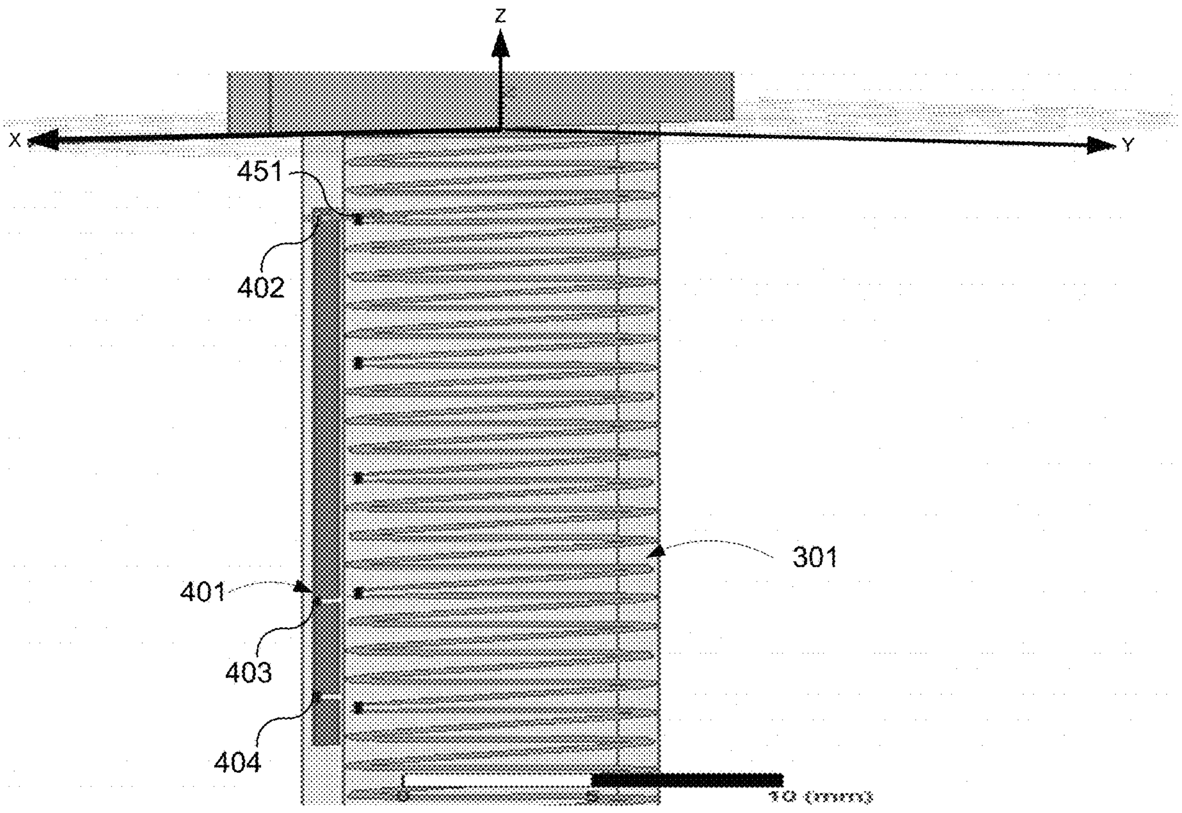
FIG. 4 shows an example of low frequency antenna section and an alternate high frequency antenna section on a printed circuit board shown in accordance with one or more aspects described herein.

FIG. 4 shows an example of low frequency antenna section 301 (as shown in FIG. 3) and alternate high frequency antenna section 401 printed on a printed circuit board in accordance with one or more aspects described herein.

Higher antenna bandwidth can often be achieved by utilizing more of the physical space available for the antenna. Longer straight sections of antenna may be preferred to short zigzag sections when space is available, typically characterized by a lower Q and correspondingly a wider frequency bandwidth and a greater antenna radiation efficiency.

Additional conductive paths may be supported by printing different conductive patterns on opposite sides of the PCB such as with antenna section 401. At higher frequencies the pitch of a serpentine pattern for the lowest frequency band may not be optimal for higher frequency operation. Using zero-ohm resistor to connect to antenna section 401 (for example, zero-ohm resistor 402 without a zero-ohm resistor being installed at location 451), a higher frequency band may be supported. The length of antenna section 401 may be further configured at time of manufacture by selectively placing zero-ohm resistors 403 and 404.

With some embodiments, combining portions of conductive patterns from both sides of the PCB may create a more desirable antenna geometry. For example, a higher frequency band copper pattern may use straight line segments on the opposite side of the board to connect every fourth cycle of a serpentine trace. This approach may produce an antenna that is approximately ¼ the length of the low frequency antenna yet fully utilize the length of the PCB area designated for the antenna.

Figure 5:
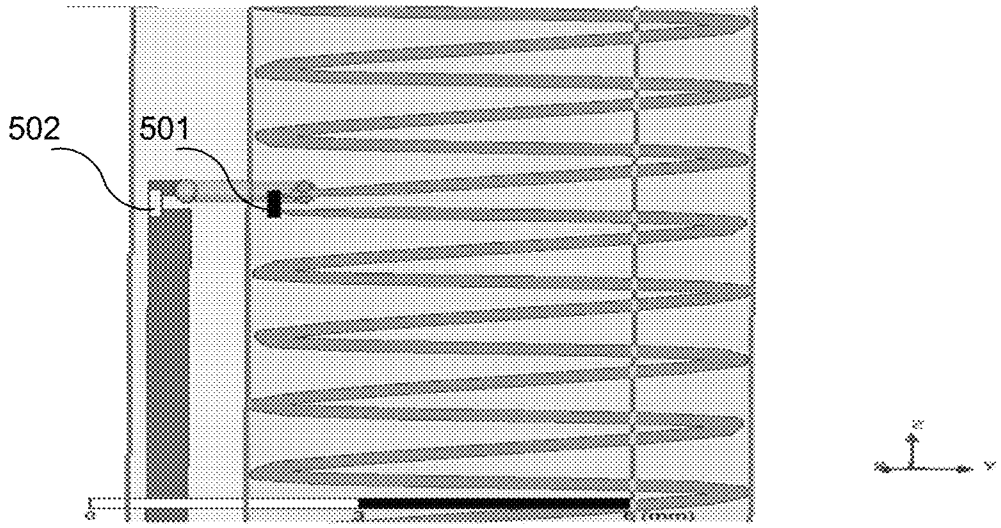
FIG. 5 shows an example of a zero-ohm resistor connecting two serpentine components with a disconnected alternate high frequency antenna section on the printed circuit board shown in FIG. 4 in accordance with one or more aspects described herein.

FIG. 5 shows an example of zero-ohm resistor 501 connecting two serpentine components of a low frequency antenna section while the configured antenna structure is disconnected from an alternate high frequency antenna section because a zero-ohm resistor is not populated at location 502.

Figure 6:
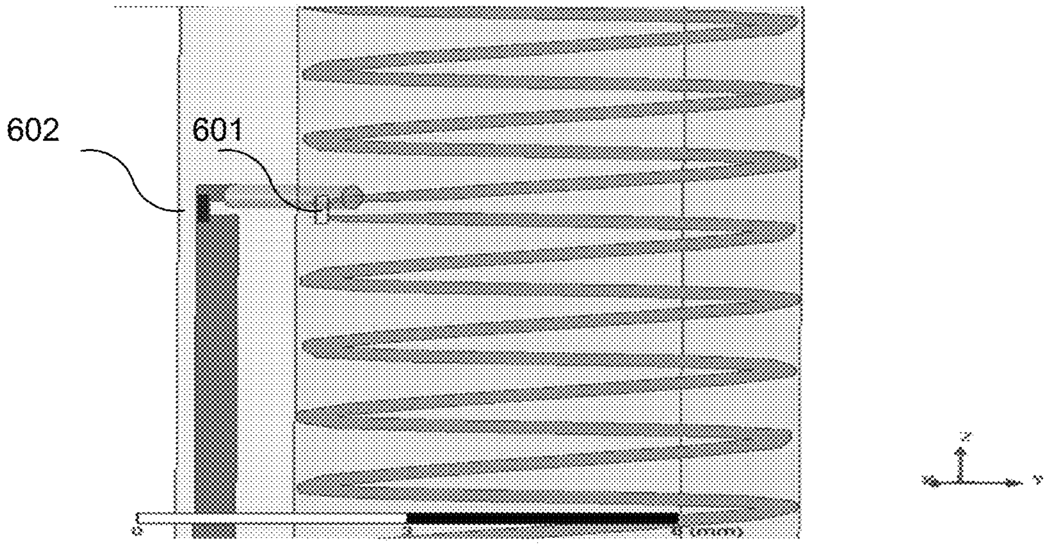
FIG. 6 shows an example of a zero-ohm resistor connecting an alternate high frequency antenna section with a disconnected low frequency antenna section on the printed circuit board shown in FIG. 4 in accordance with one or more aspects described herein.

FIG. 6 shows an example of zero-ohm resistor 602 connecting an alternate high frequency antenna section while the configured antenna structure is disconnected from a low frequency antenna section because a zero-ohm resistor is not populated at location 601.

Referring back to FIG. 4, the shown antenna structure supports an integrated printed monopole antenna located at the bottom of transmitter RF PCB for a wireless microphone. A dipole is formed using the transmitter RF PCB ground plane as a counterpoise. Lower frequency band antennas (for example, 470 MHz to 750 MHz) use one or more sections of a serpentine copper trace connected in series using zero-ohm resistors. Removing zero-ohm resistors, starting from the bottom of the antenna shortens the antenna structure configuring resonance at the next higher frequency band.

With some embodiments, a ground for the antenna structure may be provided by a ground plane supported by PCB and/or chassis enclosing the PCB assembly.

At frequencies above 750 MHz for the shown embodiment, all resistors on the serpentine path are removed and a zero-ohm resistor is placed on the back of the PCB to connect an alternate high frequency band antenna. This antenna configuration has higher bandwidth and improved impedance characteristic over a short serpentine antenna for higher frequency operation. The first serpentine component is used as part of both high and low frequency antennas in order to get the desired high frequency antenna length.

Embodiments of the disclosure may support different types of antennas including a dipole antenna, loop antenna, planar inverted-F antenna (PIFA), and other types of patch antennas.

Figure 7:
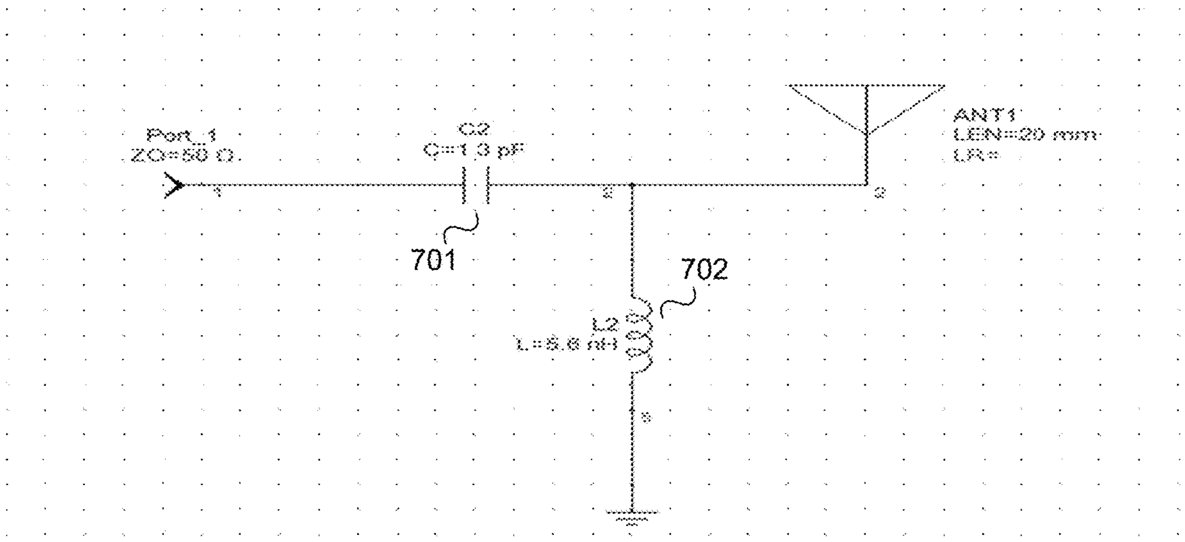
FIG. 7 shows an example of a matching circuit matching an RF circuit impedance with an antenna configured on the printed circuit board shown in FIG. 4 in accordance with one or more aspects described herein.
Figure 10:
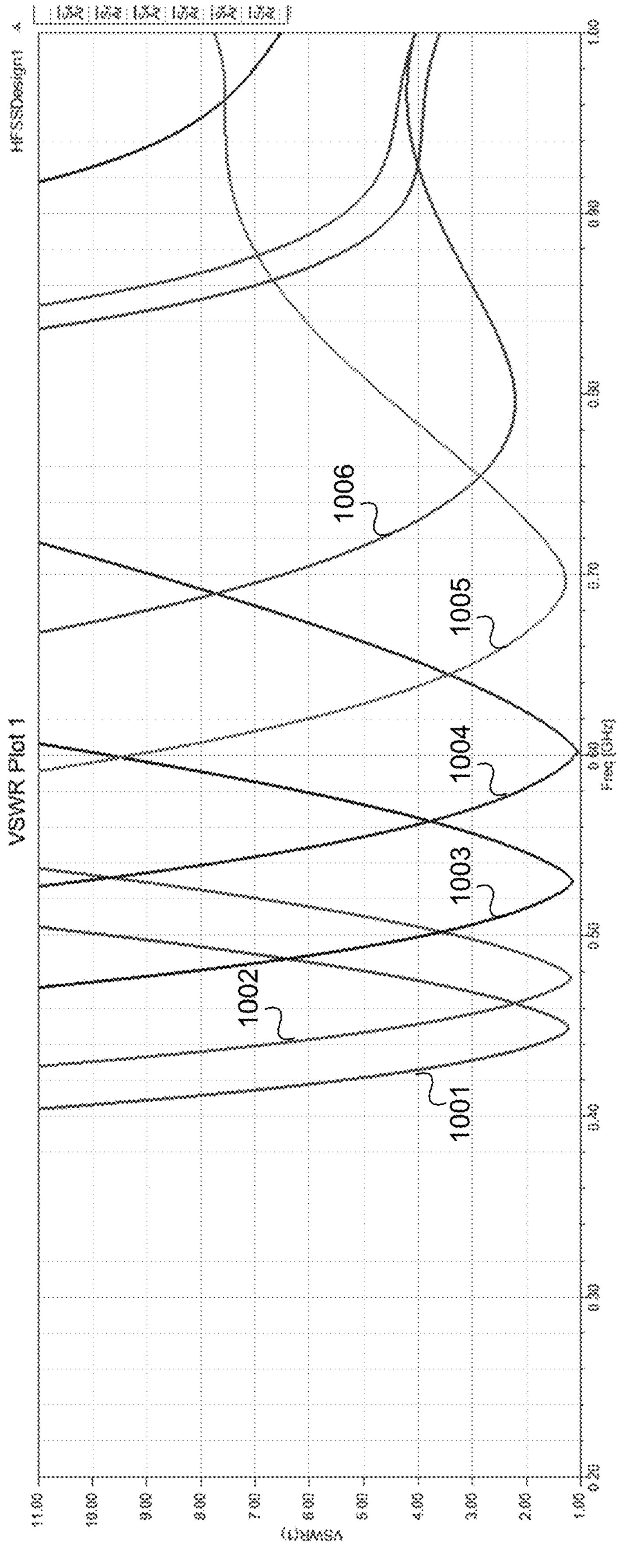
FIG. 10 shows an example of VSWR plots for an antenna configured with different serpentine antenna components on the printed circuit board shown in FIG. 4 in accordance with one or more aspects described herein.

FIG. 7 shows an example of a matching circuit configured to match an RF circuit with an antenna configured on the printed circuit board shown in FIG. 4. A matching network may be used to help match the antenna to the RF circuit, typically 50 ohms. Matching circuit 700 is configured for an antenna configuration with a higher frequency antenna section 401 of length 20 mm. Matching circuit 700 comprises capacitor 701 and inductor 702. However, impedance matching may not be needed for a frequency band if the VSWR is sufficiently close to unity without matching. For example, referring to FIG. 10, plots 1001-1005 (corresponding to 28, 24, 20, 16, and 12 serpentine cycles, respectively), have a VSWR of approximately 1.0 at the center frequencies.

Based on the matching requirements for the configured frequency band, electrical elements for capacitor 701 and inductor 702 may be populated during manufacture. When matching is not required, capacitor 701 may be replaced with a shorting electrical element (for example, a zero-ohm resistor) while inductor 701 is left unpopulated.

Figure 8:
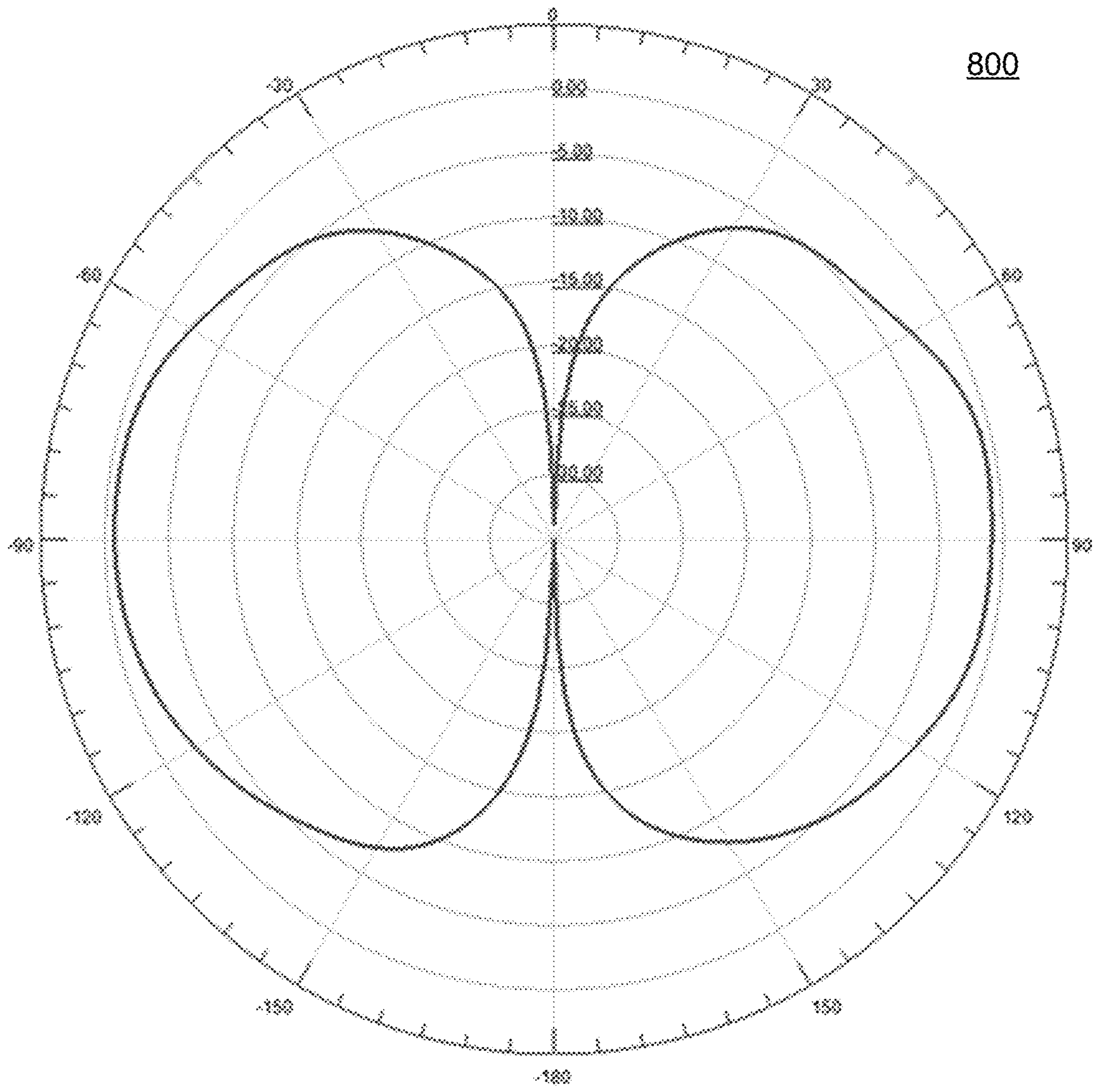
FIG. 8 shows an example of an antenna gain plot at 470 MHz with Theta polarization for all values of Theta at Phi=0 degrees for an antenna configured on the printed circuit board shown in FIG. 4 in accordance with one or more aspects described herein.

FIG. 8 shows an example of an antenna gain plot at 470 MHz (low frequency antenna section 301 having 20 serpentine cycles) with Theta (θ) polarization for all values of Theta (θ) at Phi (φ)=0 degrees for an antenna configured on the printed circuit board shown in FIG. 4.

Figure 9:
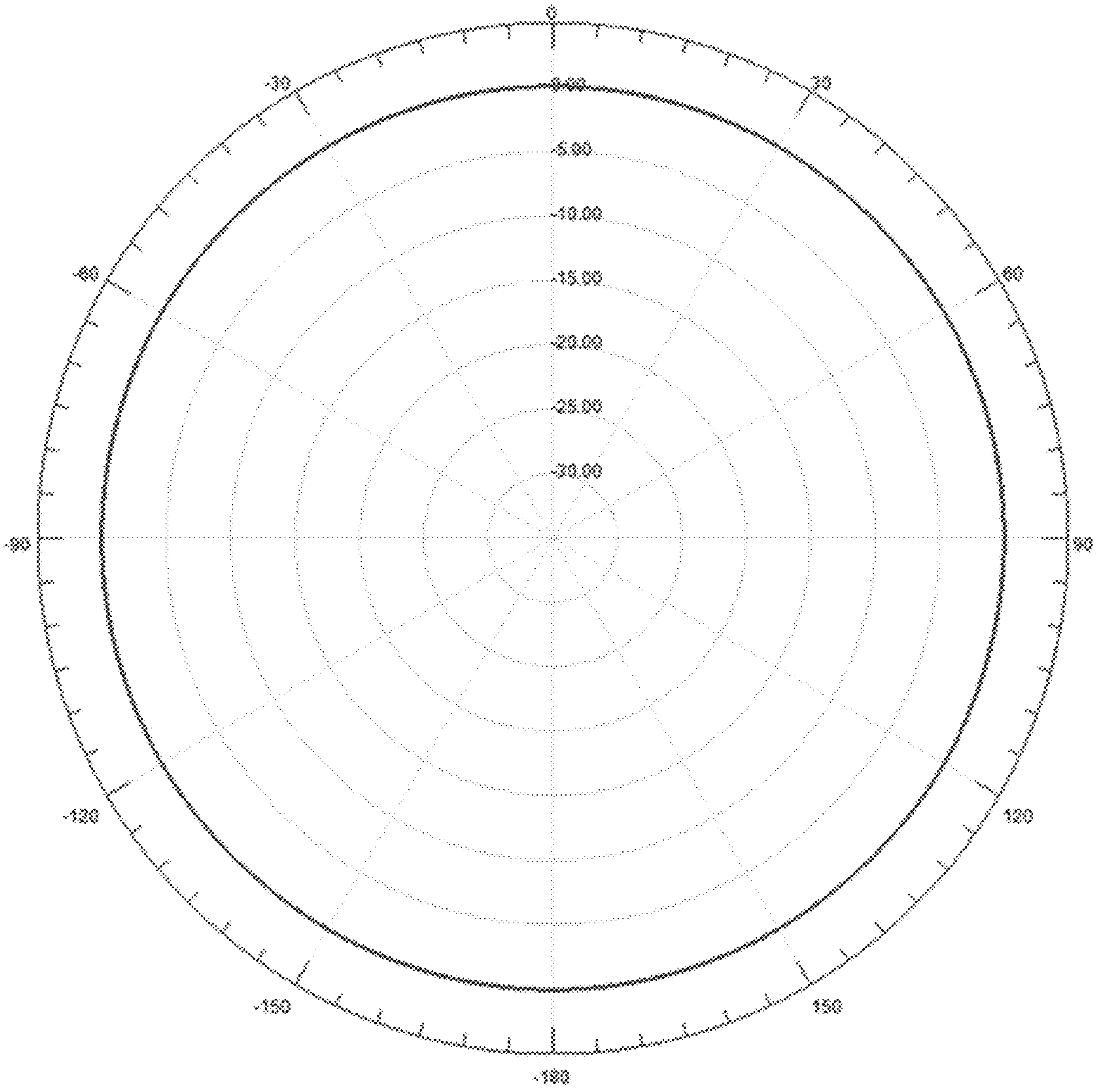
FIG. 9 shows an example of an antenna gain plot at 470 MHz with Theta polarization for all values of Phi at Theta=90 degrees for an antenna configured on the printed circuit board shown in FIG. 4 in accordance with one or more aspects described herein.

FIG. 9 shows an example of an antenna gain plot at 470 MHz (low frequency antenna section 301 having 20 serpentine cycles) with (θ) Theta polarization for all values of Phi (φ) at Theta (θ)=90 degrees for an antenna configured on the printed circuit board shown in FIG. 4.

FIG. 10 shows an example of VSWR plots for an antenna configured with different serpentine antenna components (corresponding to lower frequency antenna section 301) on the printed circuit board shown in FIG. 4. Plots 1001, 1002, 1003, 1004, 1005, and 1006 correspond to 28, 24, 20, 16, 12, and 8 serpentine cycles, respectively, by appropriately placing zero-ohm resistors along antenna section 301.

Figure 11:
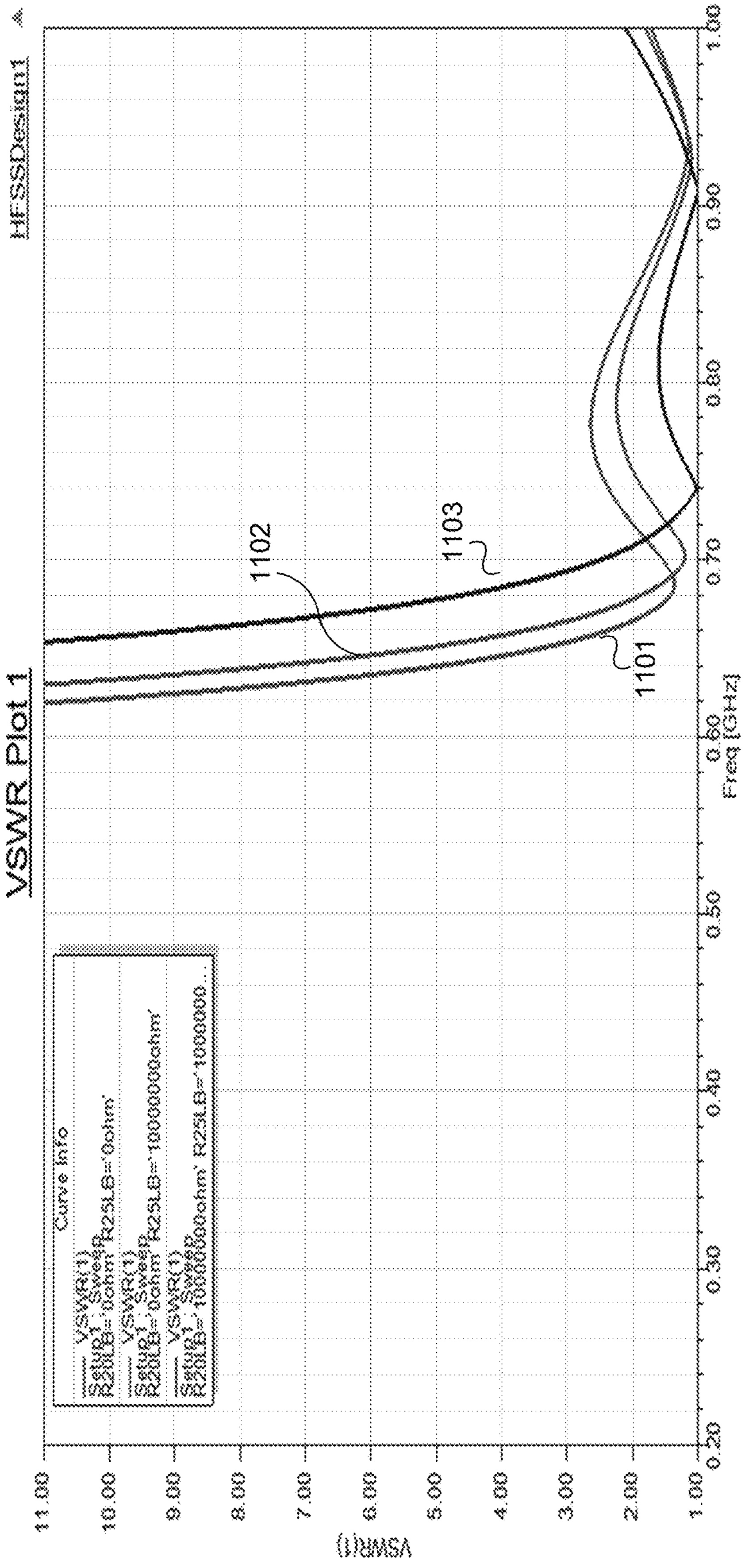
FIG. 11 shows an example of VSWR plots for an antenna configured with different alternate high frequency components on the printed circuit board shown in FIG. 4 in accordance with one or more aspects described herein.

FIG. 11 shows an example of a VSWR plot for an antenna configured with different alternate high frequency components (corresponding to higher frequency antenna section 401) on the printed circuit board shown in FIG. 4. Plots 1101, 1102, and 1103 correspond to lengths of section 401 equal to 28 mm (zero-ohm resistors 401, 402, and 403 installed), 25 mm (zero-ohm resistors 401 and 402 installed), and 20 mm (zero-ohm resistor 401 installed).

Various aspects described herein may be embodied as a method, an apparatus, or as computer-executable instructions stored on one or more non-transitory and/or tangible computer-readable media. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

Exemplary Clauses

1. A printed circuit board (PCB) antenna assembly comprising:
   a printed circuit board;
   at least one passive linear lumped electrical element; and
   a first antenna section comprising first and second antenna components, wherein the first and second antenna components are selectively coupled through a first passive linear lumped electrical element, wherein the PCB antenna assembly is configured for a first frequency band when the first passive linear lumped electrical element is placed on the printed circuit board between the first and second antenna components.
2. The printed circuit board antenna assembly of clause 1, further comprising:
   a second antenna section selectively coupled to the first antenna section.
3. The printed circuit board antenna assembly of clause 2, wherein the second antenna section is electrically coupled to the first antenna section through a second passive linear lumped electrical element when the first passive linear lumped electrical element is not placed between the first and second antenna components and wherein the printed circuit board antenna is configured for a second frequency band.
4. The printed circuit board antenna assembly of clause 3, wherein the second antenna section is electrically coupled to the first antenna section through an electrical VIA and wherein the first and second antenna sections are located on different PCB layers of the printed circuit board.
5. The printed circuit board antenna assembly of clause 1, wherein first antenna section further comprises a third antenna component, wherein the second and third antenna components are electrically coupled through a third passive linear lumped electrical element when the first passive linear lumped electrical element is placed on the printed circuit board between the first and second antenna components, and wherein the printed circuit board antenna assembly is configured for a third frequency band.
6. The printed circuit board antenna assembly of clause 1, wherein the first passive linear lumped electrical element is packaged as a surface-mount lumped electrical element.
7. The printed circuit board antenna assembly of clause 1, wherein the first passive linear lumped electrical element is packaged as an inserted electrical element.
8. The printed circuit board antenna assembly of clause 1, wherein the first passive linear lumped electrical element comprises a zero-ohm resistor.
9. The printed circuit board antenna assembly of clause 1, wherein the first passive linear lumped electrical element comprises an inductor.
10. The printed circuit board antenna assembly of clause 1, wherein the first passive linear lumped electrical element comprises a capacitor.
11. The printed circuit board antenna assembly of clause 3, wherein the second antenna section comprises a fourth antenna component and a fifth antenna component and wherein the fourth and fifth antenna components are electrically coupled through a fourth passive linear electrical component, and wherein the printed circuit board antenna is configured for a fourth frequency band.
12. The printed circuit board antenna assembly of clause 1, wherein the first antenna section comprises a metallic foil applied on the printed circuit board.
13. The printed circuit board antenna assembly of clause 1, wherein the first antenna section comprises an external antenna element.
14. The printed circuit board antenna assembly of clause 1, wherein the first antenna component comprises a first trace with a serpentine pattern.
15. The printed circuit board antenna assembly of clause 11, wherein the fourth antenna component comprises a second trace with a first straight line segment.
16. The printed circuit board antenna assembly of clause 1, wherein the first antenna component comprises a third trace with a second straight line segment.

17. The printed circuit board antenna assembly of clause 1, wherein the first antenna component and the second antenna component are characterized by different trace patterns.

18. A printed circuit board (PCB) wireless microphone assembly comprising:

at least one zero-ohm resistor;

a first antenna section comprising first and second serpentine components, wherein the first and second serpentine components are selectively coupled through a first zero-ohm resistor, wherein the PCB wireless microphone assembly is configured for a first frequency band when the first zero-ohm resistor is placed between the first and second serpentine components; and a second antenna section selectively coupled to the first antenna section.

19. The printed circuit board wireless microphone assembly of clause 18, wherein the first zero-ohm resistor is packaged as a surface-mount resistor.

20. The printed circuit board wireless microphone assembly of clause 18, wherein the second antenna section is electrically coupled to the first antenna section through a second zero-ohm resistor when the first zero-ohm resistor is not placed between the first and second serpentine components and wherein the printed circuit board antenna assembly is configured for a second 21. The printed circuit board wireless microphone assembly of clause 20, wherein the second antenna section is electrically coupled to the first antenna section through an electrical VIA and wherein the first and second antenna sections are located on opposite outside PCB layers of the printed circuit board.

22. The printed circuit board wireless microphone assembly of clause 20, wherein first antenna section further comprises a third serpentine component, wherein the second and third serpentine components are electrically coupled through a third zero-ohm resistor when the first zero-ohm resistor is placed between the first and second serpentine components, and wherein the printed circuit board antenna assembly is configured for a third frequency band.

23. An antenna of a wireless communication assembly comprising a printed circuit board (PCB), wherein the antenna is configurable for one of a plurality of frequency bands, the antenna comprising:

a first radiating section comprising a first antenna component and a second antenna component, wherein the first radiating section comprises a first metallic foil applied on a first PCB layer of the printed circuit board, wherein the first and second antenna components are selectively coupled through a first passive linear lumped electrical element and wherein the antenna is configured for a first frequency band when the first passive linear lumped electrical element is placed on the printed circuit board between the first and second antenna components.

24. The antenna of clause 23, further comprising:

a second radiating section comprising a third antenna component and a fourth antenna component, wherein the second radiating section comprises a second metallic foil applied on a second PCB layer of the printed circuit board, 25. The antenna of clause 24, wherein the second radiating section is electrically coupled to the first radiating section through a second passive linear lumped electrical element when the first passive linear lumped electrical element is not placed between the first and second antenna components and wherein the antenna is configured for a second frequency band.

26. The antenna of clause 24, wherein the third and fourth antenna components are electrically coupled through a third passive linear lumped electrical element.

27. The antenna of clause 23, wherein the first passive linear lumped electrical element comprises a zero-ohm resistor.

28. The antenna of clause 23, wherein the first antenna component comprises a first serpentine component and the second antenna component comprises a second serpentine component.

29. The antenna of clause 23 further comprising a first antenna ground, the first antenna ground comprising a ground plane of the printed circuit board, wherein the ground plane is located on one of the PCB layers.

30. The antenna of clause 23 further comprising a second antenna ground, the second antenna ground comprising a portion of a chassis of the wireless communication assembly.

31. The antenna of clause 24 further comprising a second antenna ground, the second antenna ground comprising a portion of a chassis of the wireless communication assembly.

What is claimed is:

1. A printed circuit board antenna assembly comprising:

a printed circuit board comprising a first layer and a second layer;

a first antenna section on the first layer of the printed circuit board and comprising a first antenna component and a second antenna component;

a first passive linear lumped electrical element on the first layer of the printed circuit board electrically coupling the first antenna component to the second antenna component to configure the printed circuit board antenna assembly for operation via at least a first frequency band;

a second antenna section on the second layer of the printed circuit board and comprising a third antenna component that is substantially wider than a width of the first antenna component and a width of the second antenna component; and a via, located in between the first layer of the printed circuit board and the second layer of the printed circuit board, electrically coupling the second antenna section on the second layer of the printed circuit board to the first antenna section on the first layer of the printed circuit board to configure the printed circuit board antenna assembly for operation via at least a second frequency band different from the first frequency band.

2. The printed circuit board antenna assembly of claim 1, wherein the first antenna component and the second antenna component both have a same serpentine pattern.

3. The printed circuit board antenna assembly of claim 1, wherein the second antenna section is electrically coupled to the first antenna section through a second passive linear lumped electrical element.

4. The printed circuit board antenna assembly of claim 1, wherein the third antenna component has a rectangular shape.

5. The printed circuit board antenna assembly of claim 1, wherein first antenna section further comprises a fourth antenna component, wherein the second and fourth antenna components are electrically coupled through a second passive linear lumped electrical element to configure the printed circuit board antenna assembly for operation via a third frequency band.

6. The printed circuit board antenna assembly of claim 1, wherein the first passive linear lumped electrical element is packaged as a surface-mount lumped electrical element.

7. The printed circuit board antenna assembly of claim 1, wherein the first passive linear lumped electrical element comprises a zero-ohm resistor.

8. The printed circuit board antenna assembly of claim 1, wherein the first passive linear lumped electrical element comprises an inductor.

9. The printed circuit board antenna assembly of claim 1, wherein the first passive linear lumped electrical element comprises a capacitor.

10. The printed circuit board antenna assembly of claim 3, wherein the second antenna section comprises a fourth antenna component, and wherein the third antenna component and the fourth antenna component are electrically coupled through a third passive linear lumped electrical component; to configure the printed circuit board antenna assembly for a third frequency band.

11. The printed circuit board antenna assembly of claim 1, wherein the first antenna section comprises a metallic trace deposited on the printed circuit board.

12. The printed circuit board antenna assembly of claim 1, wherein the first antenna component comprises a trace with a serpentine pattern.

13. The printed circuit board antenna assembly of claim 10, wherein the fourth antenna component comprises a trace with a straight line segment.

14. The printed circuit board antenna assembly of claim 1, wherein the first antenna component comprises a trace with a straight line segment.

15. The printed circuit board antenna assembly of claim 1, wherein the first antenna component and the second antenna component are characterized by different trace patterns.

16. The printed circuit board antenna assembly of claim 3, wherein the second antenna section is selectively coupled to the first antenna section at one of a plurality of locations along the first antenna section through the second passive linear lumped electrical element.

17. The printed circuit board antenna assembly of claim 1, wherein the third antenna component comprises a trace with a straight line segment.

18. A printed circuit board antenna assembly comprising:

a printed circuit board comprising a first layer and a second layer;

a first antenna section on the first layer of the printed circuit board and comprising a first antenna component and a second antenna component, wherein the first antenna component and the second antenna component both have a same serpentine pattern;

a first passive linear lumped electrical element on the first layer of the printed circuit board electrically coupling the first antenna component to the second antenna component to configure the printed circuit board antenna assembly for operation via at least a first frequency band;

a second antenna section on the second layer of the printed circuit board and comprising a third antenna component that has a rectangular shape; and a via, located in between the first layer of the printed circuit board and the second layer of the printed circuit board, electrically coupling the second antenna section on the second layer of the printed circuit board to the first antenna section on the first layer of the printed circuit board to configure the printed circuit board antenna assembly for operation via at least a second frequency band different from the first frequency band.

19. The printed circuit board antenna assembly of claim 18, wherein the third antenna component is substantially wider than a width of the first antenna component and a width of the second antenna component.

20. The printed circuit board antenna assembly of claim 18, wherein the second antenna section is electrically coupled to the first antenna section through a second passive linear lumped electrical element.

21. The printed circuit board antenna assembly of claim 20, wherein the second antenna section is selectively coupled to the first antenna section at one of a plurality of locations along the first antenna section through the second passive linear lumped electrical element.

22. The printed circuit board antenna assembly of claim 18, wherein first antenna section further comprises a fourth antenna component, wherein the second and fourth antenna components are electrically coupled through a second passive linear lumped electrical element to configure the printed circuit board antenna assembly for operation via a third frequency band.

23. The printed circuit board antenna assembly of claim 22, wherein the fourth antenna component comprises a trace with a straight line segment.

24. The printed circuit board antenna assembly of claim 18, wherein the first passive linear lumped electrical element is packaged as a surface-mount lumped electrical element.

25. The printed circuit board antenna assembly of claim 18, wherein the first passive linear lumped electrical element comprises a zero-ohm resistor.

26. The printed circuit board antenna assembly of claim 18, wherein the first passive linear lumped electrical element comprises an inductor.

27. The printed circuit board antenna assembly of claim 18, wherein the first passive linear lumped electrical element comprises a capacitor.

28. The printed circuit board antenna assembly of claim 18, wherein the second antenna section comprises a fourth antenna component, and wherein the third antenna component and the fourth antenna component are electrically coupled through a third passive linear lumped electrical component to configure the printed circuit board antenna assembly for a third frequency band.

29. The printed circuit board antenna assembly of claim 18, wherein the first antenna section comprises a metallic trace deposited on the printed circuit board.

30. The printed circuit board antenna assembly of claim 18, wherein the first antenna component comprises a trace with a straight line segment.

31. The printed circuit board antenna assembly of claim 18, wherein the third antenna component comprises a trace with a straight line segment.

* * * * *